July 9, 1963  J. W. LINTERN  3,097,263
REFRIGERATED PROTECTIVE ENCLOSURE FOR TELEVISION CAMERAS
Filed March 30, 1961  3 Sheets-Sheet 1

INVENTOR.
JAMES W. LINTERN
BY
John H. Leonard,
his ATTORNEY

July 9, 1963 J. W. LINTERN 3,097,263
REFRIGERATED PROTECTIVE ENCLOSURE FOR TELEVISION CAMERAS
Filed March 30, 1961 3 Sheets-Sheet 2

INVENTOR.
JAMES W. LINTERN
BY
John H. Leonard,
his ATTORNEY

INVENTOR.
JAMES W. LINTERN
BY
ATTORNEY

United States Patent Office 3,097,263
Patented July 9, 1963

3,097,263
REFRIGERATED PROTECTIVE ENCLOSURE FOR TELEVISION CAMERAS
James W. Lintern, Madison, Ohio, assignor to The Lintern Corporation, Painesville, Ohio, a corporation of Ohio
Filed Mar. 30, 1961, Ser. No. 99,614
3 Claims. (Cl. 178—7.1)

This invention relates to a protective enclosure or cabinet for television cameras, and particularly to a refrigerated enclosure arranged to protect the camera from external sources of heat and to dissipate the heat generated by the camera itself within the enclosure.

Heretofore, in connection with industrial furnaces, such as annealing furnaces and the like, attempts have been made to monitor continually the interior of the heated furnaces and the contents by means of television cameras. For such purposes, the camera lens must be placed closely adjacent a peephole in the furnace wall and thus is subjected to very high temperature radiations from the furnace interior. The temperatures are such that, combined with the heat generated by the camera itself, the camera soon deteriorates to the point of becoming inoperative and requiring considerable servicing. Again, high temperature air currents adjacent the lens can cause distortion of the image. The surrounding atmosphere in which the camera must operate is laden with dust and foreign material and it is necessary that the camera lenses be protected therefrom.

In accordance with the present invention, an enclosure or cabinet is provided in which a conventional television camera can be mounted and arranged close to the peephole of an operating furnace and continually directed through the peephole while protected from the heat normally radiating from the interior of the furnace through the peephole.

More specifically, the enclosure or cabinet is one in which the camera is supported, and insulated and protected from the external heat both by heat insulating walls of the enclosure and by convection currents and heat shields and, at the same time, in which the interior in which the camera is located, is refrigerated so as to reduce the heating effects caused by the infiltration of heat from the exterior and heat generated in the insulated enclosure by the camera itself.

More specific objects and advantages of the invention will become apparent from the following description of a preferred embodiment thereof illustrated in the drawings, of which:

Figure 1:
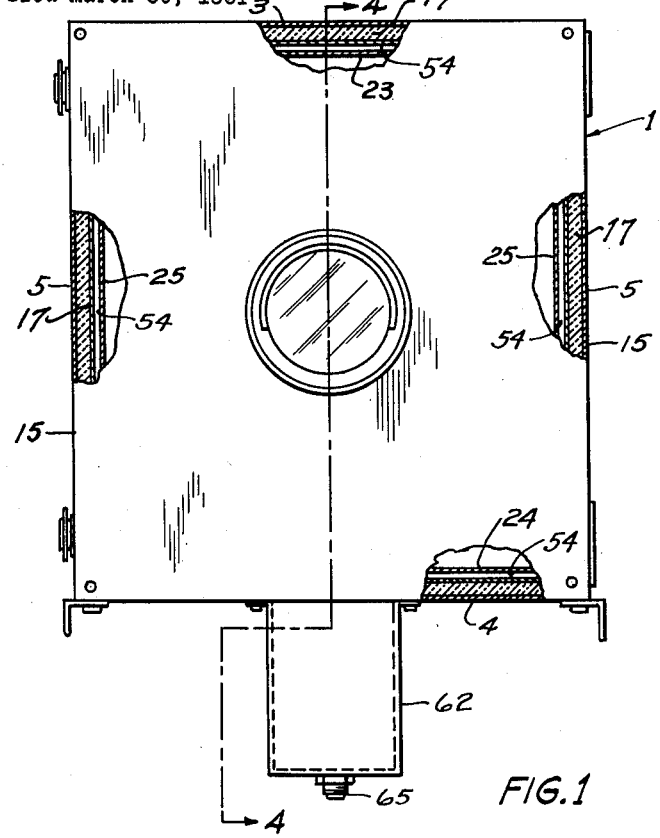
FIG. 1 is a front elevation of a protective enclosure embodying the principles of the present invention.
Figure 2:
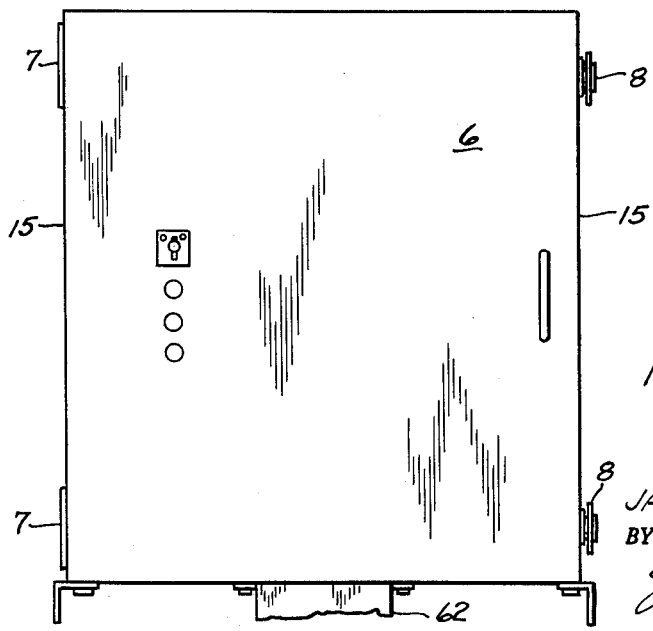
FIG. 2 is a rear elevation thereof.
Figure 3:
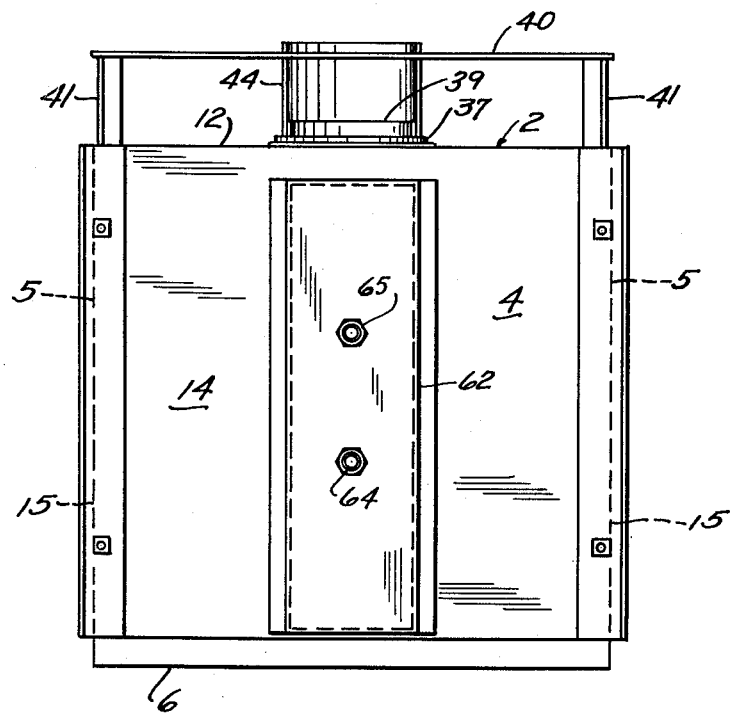
FIG. 3 is a bottom plan view of the enclosure shown in FIGS. 1 and 2.

Referring to the drawing, the enclosure, indicated generally at 1, comprises a cabinet or box in which the camera can be fully enclosed, the exact shape of the box being secondary. For purposes of illustration, it is shown as essentially a cubical box having a front wall 2, a top wall 3, a bottom wall 4, side walls 5, and a rear wall which is in the form of a door 6. The door 6 is secured to the cabinet by suitable hinges 7. Suitable clasps 8 of any conventional type are used for latching the door firmly in closed position.

Referring to the general structure of the box, the box comprises an outer metal shell 11 having a front wall 12, a top wall 13, a bottom wall 14, side walls 15, corresponding, respectively, to the walls 2, 3, 4, and 5 of the box as a whole. The shell 11 is open at the rear, except for closure by the door 6 which has an outer shell wall 16 of metal. While the walls of the shell and the rear or outer wall of the door 6 preferably are metal, they may be other material, if desired.

The entire shell 11 is lined with insulating material which may be of a conventional fiber glass or other suitable insulating material. The insulation shown is fiber glass and on the top, bottom and side walls is about 1⅛ inch thick. On the front wall, it is about 1¹¹⁄₁₆ inches in thickness.

Figure 4:
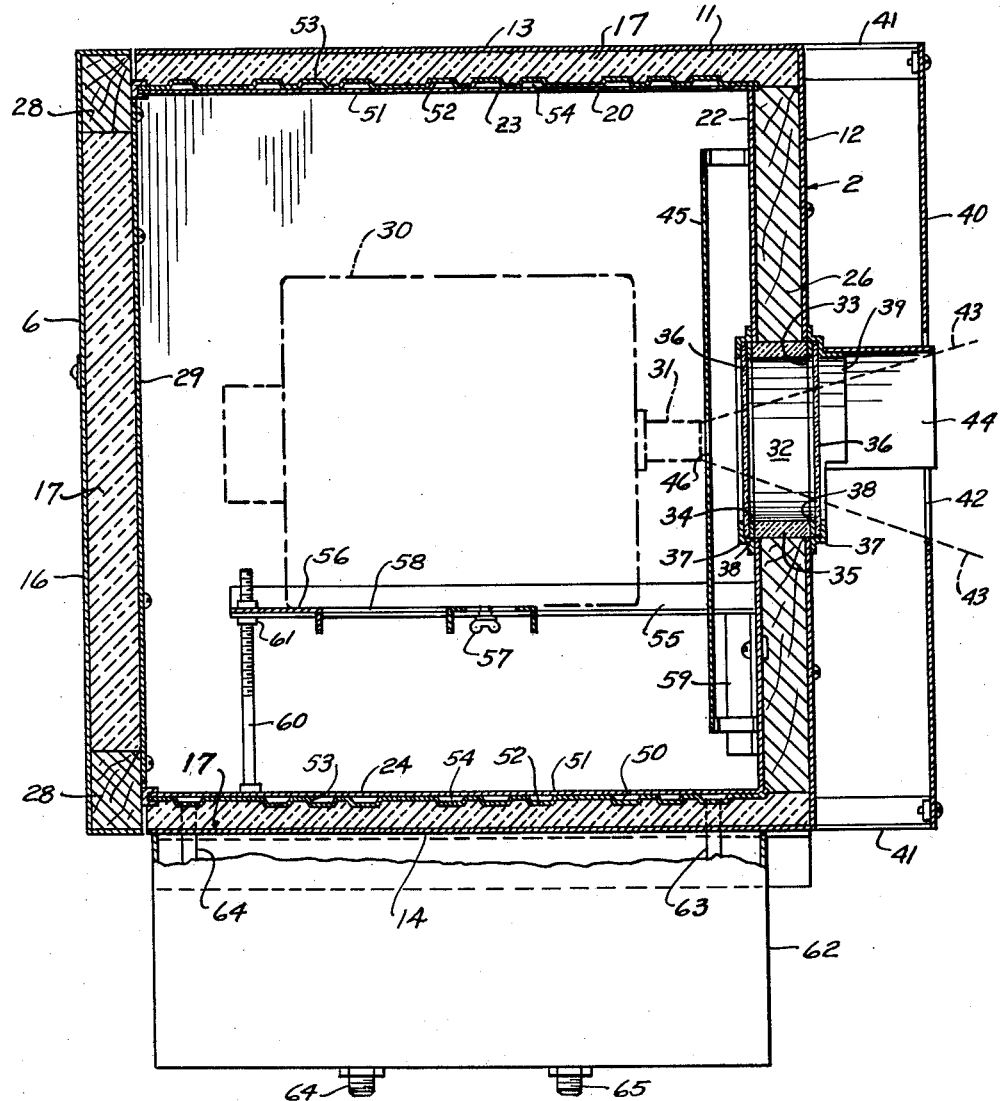
FIG. 4 is an enlarged vertical longitudinal sectional view through the enclosure taken on the line 4—4 of FIG. 1.

Within the shell 11 is an inner metal shell 20, having a front wall 22, a top wall 23, a bottom wall 24, and side walls 25 corresponding, respectively, to the walls 2, 3, 4 and 5. The shell 20 is open at the rear. It is arranged with its walls juxtaposed against the insulating lining of the corresponding walls of the outer shell by which the inner shell may be spaced from the outer shell. Suitable wood spacers 26 may be provided, if desired, between the front wall 12 of the outer shell and the front wall 22 of the inner shell. The door 6 is provided with spacers 28 at its lateral edges, and has an inner sheet metal liner 29. Thus, the box can be closed and thereby provide a completely insulated compartment in which a television camera 30 can be installed, as indicated by the dot-dash line in FIG. 4.

The camera 30 may be of the conventional type having a forwardly projecting lens mechanism 31 facing the front wall 22 and closely adjacent to the interior of the wall 22.

The wall 2 has a peephole, indicated generally at 32, formed by providing an opening 33 in the wall 12, an aligned opening 34 in the inner wall 22, and a suitable sleeve 35 of insulating material extending through the walls and openings defining the peephole.

Suitable transparent panes 36, preferably of quartz or high heat resistant glass, are secured in firm juxtaposition with the outer face of the wall 12 and inner face of the wall 22, by suitable bezels 37, so as to prevent the passage of air through the peephole 32. Suitable gaskets 38 are interposed between the panes and bezels.

Arranged exteriorly of the forward wall 2 is a suitable dust hood support 39 which may be open at the bottom but which extends around the upper periphery of the peephole 32 partway downwardly along its sides to a point below its center so as to prevent dust and the like from striking the pane 36.

In order to reduce the heat radiations striking the wall 12, a heat deflecting shield 40 is provided. The shield 40 is arranged in forwardly spaced relation to the wall 12 and supported in fixed position by suitable brackets 41. The shield 40 may be of heat conducting material. It has an opening 42 aligned with the peephole 32 and sufficiently larger so that diverging rays, indicated by the dotted lines 43, from the lens 31 can pass readily therethrough. A dust hood 44 extends from the hood support forwardly across the space between the shield 40 and the wall 2. The shield 40 and wall 2 define a convection air passage which is open at the top and bottom, and preferably also at the sides. Thus the heat radiations emanating from the peephole in the furnace strike the shield 40. Since the sheet is metal, the heat is readily conducted away from the immediate vicinity of the peephole or passage 42 and can be dissipated from the shield 40. This dissipation is assisted greatly by the upward convection of currents, induced by the heating of the shield 40, in the space between the shield 40 and the wall 12.

Correspondingly, within the enclosure a second deflecting shield 45 is provided. This shield is spaced rearwardly from the interior wall 22 of the shell 11 and defines therewith a passage 46 aligned with the lens 31 of the camera and so arranged that the diverging rays from the lens can pass readily therethrough without interference.

This shield intercepts heat from the camera and forms a "cool air" passage between the rear face of the wall 22 and forward face of the shield. This space is open at the top and bottom, and preferably at the sides, so that the heated air rising from the television camera rearwardly from the shield 45 and chilled by the refrigerant, as hereinafter disclosed, flows downwardly from the top to the bottom of the enclosure 1 in the "cool air" passage between the shield 45 and the rear face of the inner forward wall 22. This current of cold air washes the inner pane 36. Due to the "cool air" passage, better convection currents are obtained for assuring contact of the warmer air in the enclosure with the refrigerating surfaces of the cooling coils, now to be described.

Arranged within the enclosure described are cooling coils, indicated generally at 50. In the preferred embodiment, these coils are provided at the top, bottom and side walls of the enclosure at the interior of the insulation. If desired, conventional cooling coils may be juxtaposed against the insulation, but it is preferred, as in the illustrative example, to use the top, side, and bottom walls of the inner shell 20 as the inner walls of the conventional ice box refrigeration coils of the plate type. In this type, two plates, at least one of which is corrugated, are arranged in spaced face to face relation with the corrugations inwardly and are sealed together about their periphery. The corrugations divide the enclosed space into a serpentine passage for refrigerant. In the illustrative example, the walls 23, 24 and 25 comprise a continuous inner plate 51 and a continuous outer corrugated plate 52 with corrugations 53 thereof juxtaposed against or close to the inner plate 51. The plates 51 and 52 are sealed together at their periphery so that the passages 54 defined by the plates between the corrugations of the sheet 52 provide a serpentine path through which the expansible refrigerant or coolant may pass for reducing the temperature within the enclosure. With this arrangement, and with the internal shield 45, ample cooling of the interior of the enclosure and its walls is obtained and the heat generated in the enclosure by the camera is readily removed. Furthermore, any heat that may penetrate into the enclosure from the exterior likewise is readily removed.

In order to support the camera in proper position within the enclosure, a suitable platform is provided. This platform may comprise a pair of angle irons 55 which support a transversely extending table top 56 on which the camera 30 rests and to which it is secured by a suitable wing bolt 57, such as is commonly used for securing the camera on a tripod. The top 56 may have openings 58 therein for assisting in the development of air currents around the camera. The front edge of the table top 56 is supported at the forward end on suitable brackets 59 and at the rear on a supporting bolt 60. A nut 61 is provided on the bolt so that the top 56 can be tilted to direct the axis of the camera properly through the peephole 32.

On its underside, the enclosure or box 1 is provided with a housing 62 to which lead the liquid refrigerant inlet 63 and gas return line 64 of the cooling coil 50.

The mechanism in the housing 62 is conventional and includes the usual expansion valves, thermostats, filters, and fittings used between refrigerant compressors and refrigeration coils or expansion chambers. They form no part of the present invention.

The refrigerant is supplied through the equipment in the housing 62 by a conventional refrigerating unit having a refrigerant supply pipe 64 leading to the coil 50 and a gas return pipe 65 leading to the compressor. If desired, a small motor driven compressor refrigeration unit can be contained within the housing 62. However, the manner and means by which the refrigerant is brought to the pipe 63 and returned through the pipe 64 form no part of the present invention.

It is apparent, therefore, that with the enclosure arranged so that its peephole is directed into the peephole of the furnace, heat radiations emanating from the peephole in the furnace first strike the deflecting shield 40 by which some of the resultant heat is deflected and the remainder heats the shield 40. Heating of the shield 40 causes upward convection air currents between the shield 40 and the front wall 12 which continually wash the forward face of the window pane 36 and the outer front wall 12 of the enclosure. Thus, the amount of heat actually reaching the outer wall 12 is moderated. However, during long periods of use, a considerable amount of heat does accumulate in the wall 12, but the penetration of this heat to the interior of the enclosure is reduced by the insulation 17. What does penetrate through into the wall 22 is removed by the refrigerant. Meanwhile, heat applied to the panes 36 which might be transferred to the lens is continuously conducted away by the external upward convection currents behind the shield 42 and by the downward internal cooling convection currents between the inner shield 45 and the inner face of the forward wall 22. These downward directed cooling air currents are concentrated at the point where most desired, as they help to carry away also the heat from the inner pane 36 caused by the rays projected from the lens 31.

It has been found that with this arrangement, a television camera can be arranged for monitoring the interior of the furnace through a peephole in the furnace wall continually for long periods of time without any deterioration in the camera.

Having thus described my invention, I claim:

1. A protective enclosure for a television camera and comprising a box having heat insulated walls and providing an enclosure adapted to accommodate a television camera, one of said insulated walls being a front wall and having a peephole therein for the lens of a camera, transparent window pane means closing the peephole, refrigerating evaporator coil means within the enclosure and having connections adapted for connection to an external refrigeration circuit for supplying refrigerant to the coil means, a heat conducting metal shield, means supporting the shield in forwardly spaced face to face relation to the front wall to provide a convection air passage therebetween, said passage being open at the top and bottom to permit convection air currents to flow upwardly as a result of heating the shield, and said shield having an opening aligned with the peephole.

2. A protective enclosure according to claim 1 wherein the space between the shield and the front wall is also open at the sides of the shield.

3. A protective enclosure for a television camera and comprising a box having heat insulated walls and providing an enclosure adapted to accommodate a television camera, one of said insulated walls being a front wall and having a peephole therein for the lens of a camera, transparent window pane means closing the peephole, refrigerating evaporator coil means within the enclosure and having connections adapted for connection to an external refrigeration circuit for supplying refrigerant to the coil means, a heat conducting metal shield, means supporting the shield in forwardly spaced face to face relation to the front wall to provide a convection air passage therebetween, said passage being open at the top and bottom to permit convection air currents to flow upwardly as a result of heating the shield, and said shield having an opening aligned with the peephole.

References Cited in the file of this patent

UNITED STATES PATENTS

| | | |
|---|---|---|
| 2,022,489 | Carpenter | Nov. 26, 1935 |
| 2,315,406 | Eddy | Mar. 30, 1943 |
| 2,712,736 | Wurtz | July 12, 1955 |